(12) United States Patent
Stahl et al.

(10) Patent No.: US 11,487,243 B2
(45) Date of Patent: Nov. 1, 2022

(54) HOLOGRAPHIC IMAGING DEVICE AND METHOD

(71) Applicant: IMEC vzw, Leuven (BE)

(72) Inventors: Richard Stahl, Rotselaar (BE); Abdulkadir Yurt, Heverlee (BE)

(73) Assignee: IMEC vzw, Leuven (BE)

( * ) Notice: Subject to any disclaimer, the term of this patent is extended or adjusted under 35 U.S.C. 154(b) by 47 days.

(21) Appl. No.: 17/033,123

(22) Filed: Sep. 25, 2020

(65) Prior Publication Data

US 2021/0116863 A1 Apr. 22, 2021

(30) Foreign Application Priority Data

Oct. 18, 2019 (EP) .................................... 19204031

(51) Int. Cl.
| | | |
|---|---|---|
| *G03H 1/04* | (2006.01) | |
| *G06T 7/586* | (2017.01) | |
| *G06T 5/00* | (2006.01) | |
| *G06T 7/00* | (2017.01) | |
| *H04N 5/225* | (2006.01) | |

(52) U.S. Cl.
CPC ........... *G03H 1/0443* (2013.01); *G06T 5/002* (2013.01); *G06T 7/0002* (2013.01); *G06T 7/586* (2017.01); *H04N 5/2256* (2013.01); *G03H 2225/12* (2013.01); *G03H 2226/02* (2013.01); *G06T 2207/30168* (2013.01)

(58) Field of Classification Search
None
See application file for complete search history.

(56) References Cited

U.S. PATENT DOCUMENTS

| 2017/0153106 A1 | 6/2017 | Ozcan et al. |
| 2018/0181062 A1* | 6/2018 | Yurt ..................... G03H 1/0005 |

FOREIGN PATENT DOCUMENTS

CN 105158894 A 12/2015

OTHER PUBLICATIONS

Mc Elhinney CP, Hennelly BM, Naughton TJ. Focused image creation approaches for macroscopic objects encoded in digital holograms. InPhoton Management III May 8, 2008 (vol. 6994, p. 69940U). International Society for Optics and Photonics. (Year: 2008).*

(Continued)

*Primary Examiner* — Clifford Hilaire
(74) *Attorney, Agent, or Firm* — Knobbe Martens Olson & Bear, LLP

(57) ABSTRACT

A holographic imaging device is disclosed. In one aspect, the holographic imaging device comprises an imaging unit comprising at least two light sources, wherein the imaging unit is configured to illuminate an object by emitting at least two light beams with the at least two light sources. A first and second light beams have different wave-vectors and wavelengths. The holographic imaging device further comprises a processing unit configured to obtain at least two holograms of the object by controlling the imaging unit to sequentially illuminate the object with respectively the first light beam and the second light beam, construct at least two 2D image slices based on the at least two holograms, wherein each 2D image slice is constructed at a determined depth within the object volume, and generate a three-dimensional image of the object based on a combination of the 2D image slices.

13 Claims, 11 Drawing Sheets

(56) References Cited

OTHER PUBLICATIONS

Cuche E, Marquet P, Depeursinge C. Spatial filtering for zero-order and twin-image elimination in digital off-axis holography. Applied optics. Aug. 10, 2000;39(23):4070-5. (Year: 2000).*
Bao et al. "Lensless phase microscopy using phase retrieval with multiple illumination wavelengths," Applied Optics, vol. 51, No. 22, Aug. 1, 2012, pp. 5486-5494.
Berdeu et al. "Comparative study of fully three-dimensional reconstruction algorithms for lens-free microscopy," Applied Optics, vol. 56, No. 13, May 1, 2017, pp. 3939-3951.
Extended European Search Report in European Patent Application No. 19204031.9, dated Mar. 9, 2020.
Luo et al. "Propagation phasor approach for holographic image reconstruction," Scientific Reports, vol. 6, No. 1, Mar. 11, 2016, in 15 pages.
Luo et al. "Wavelength scanning achieves pixel super-resolution in holographic on-chip microscopy," SPIE, Optics and Biophotonics in Low-Resource Settings II, vol. 9699, Mar. 2016, pp. 96990A-1-96990A-8.
McElhinney et al. "Focused image creation approaches for macroscopic objects encoded in digital holograms," Proceedings of SPIE, Photon Management III, vol. 6994, Apr. 25, 2008, pp. 69940U-1 to 69940U-12.
Zhang et al. "Multi-wavelength multi-angle reflection tomography," Optics Express, vol. 26, No. 20, Oct. 1, 2018, pp. 26093-26105.
Zuo et al. "Lensless phase microscopy and diffraction tomography with multi-angle and multi-wavelength illuminations using a LED matrix," Optics Express, vol. 23, No. 11, Jun. 1, 2015, pp. 14314-14328.

* cited by examiner

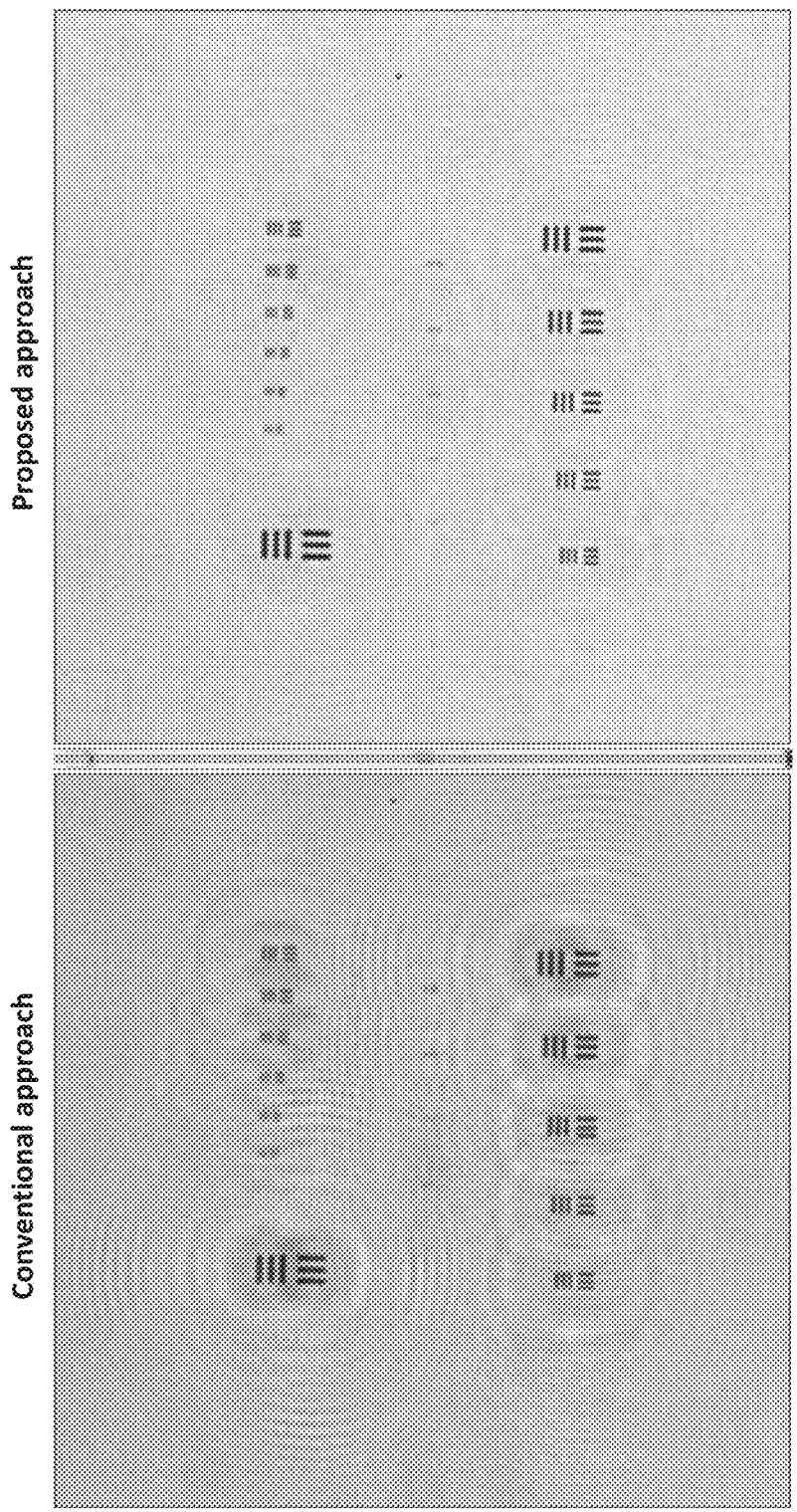

HOLOGRAPHIC IMAGING DEVICE AND METHOD

CROSS-REFERENCE TO RELATED APPLICATIONS

This application claims foreign priority to EP 19204031.9, filed Oct. 18, 2019, the contents of which are incorporated by reference herein in their entirety.

BACKGROUND OF THE INVENTION

Technological Field

The disclosed technology relates to a holographic imaging device and to a method for generating a three-dimensional (3D) image of an object, based on obtaining holograms of the object using at least two light beams. In particular, the holographic imaging device and the method may improve axial resolution of conventional inline holographic imaging. The holographic imaging device and the method may be applicable for microscopic imaging of volume samples used for quantitative image analysis.

Description of the Related Technology

Conventional lens-free imaging (e.g., based on inline holography) is a powerful microscopic imaging method, which does not require any lenses or other optical or mechanical components to form an image. While it has many advantages, for example hardware simplicity, one of its known limitations is its weak signal localization in 3D space, and, thus, it has been popular for imaging planar (i.e., two dimensional (2D)) sparse samples localized in a surface parallel to the image sensor.

Lens-free imaging on samples with a 3D structure is challenging, due to two distinct reasons. First, this imaging method has a limited depth of resolution, due to low "effective NA" or "missing cone in k-space" of the system. This limitation combined with the holographic nature of the image recording, i.e., the samples along the beam path are recorded in the optical image regardless of their depth, makes the imaging of 3D samples challenging. The signals from different depths can interfere with each other and are not localized. Second, the loss of phase information by hologram recording leads to a problem of twin image noise. Twin images arise because the image reconstruction process yields identical solutions for the object and the imaginary mirror object located at the same distance to an imager but with a negative sign. In practice, this effect can lead to a merging of the original object image with its defocused image appearing together in the reconstructed image. The two effects combined create a considerable problem for applying lens-free imaging to 3D samples.

The two effects are visually explained in the diagram 110 of FIG. 11. The diagram 110 illustrates a sample consisting of multiple 10-µm-sized beads randomly distributed in a volume. The hologram obtained from these beads is reconstructed at a certain slice in the volume. Even though the in-focus beads can be identified visually in the slice reconstruction, the signal originating from the beads from a different slice strongly interferes with the signal originating from the beads in the slice. Furthermore, the in-focus beads signal is corrupted with the beads signal originating from the "ghost beads" located in a far distance.

SUMMARY OF CERTAIN INVENTIVE ASPECTS

In view of the above-mentioned disadvantages, embodiments of the disclosed technology aim to improve axial resolution of conventional inline holographic imaging. An objective is in particular to provide a holographic imaging device and a method, which enable 3D representation of objects. To this end, a main goal is out-of-focus plane signal suppression in a 2D image generated by a lens-free system.

The objective is achieved by the embodiments of the disclosed technology provided in the enclosed independent claims. Advantageous implementations of these embodiments are defined in the dependent claims.

In particular, a distinguishable signature for the out-of-focus objects may be determined, and then the out-of-focus signals may be suppressed while preserving the in-focus signal.

The main advantages of the embodiments of the disclosed technology may be summarized as follows:
- Lower hardware complexity compared to, e.g., conventional tomography methods.
- Lower costs, higher reliability, easy to maintain and service the device.
- Lower computational complexity compared to deconvolution/topography methods, which may provide faster results and lower power consumption.

A first aspect of the disclosed technology provides a holographic imaging device comprising an imaging unit comprising at least two light sources, wherein the imaging unit is configured to illuminate an object by emitting at least two light beams with the at least two light sources, wherein a first light beam has a first wave-vector and a first wavelength and a second light beam has a second wave-vector that is different from the first wave-vector and a second wavelength that is different from the first wavelength; and a processing unit configured to obtain at least two holograms of the object by controlling the imaging unit to sequentially illuminate the object with the first light beam and the second light beam, respectively, construct at least two two-dimensional (2D) image slices based on the at least two holograms, wherein each 2D image slice is constructed at a determined depth within the object volume, and generate a three-dimensional (3D) image of the object based on a combination of the 2D image slices.

The holographic imaging device of the first aspect may be based on a lens-free system, which may remove out-of-focus plane signals in the constructed 2D image slices. In particular, the holographic imaging device may provide techniques to create a distinguishable signature for the out-of-focus objects, and then remove (i.e., suppress) the out-of-focus signals while preserving the in-focus signal.

More specifically, the holographic imaging device can use the imaging unit and an illumination method entailing multiple light beams with both an angular (wave vector) plurality and a spectral (wavelength) plurality. The holograms recorded with such pluralities may further be reconstructed digitally based on the 2D diffraction theory and image processing algorithms. For example, the processing unit of the holographic imaging device may provide an algorithm, which may use the differences in recorded holograms generated by the angular and spectral pluralities in an iterative procedure, in which at each step the in-focus signals are identified and cleaned from the out-of-focus signals, until the algorithm converges to the desired result. This process may be repeated several times at different depths (e.g., depths within the object). The depth within the object may be, for example, a distance from a predefined position, e.g., front to the back of the object, a horizontal measurement of the object's protrusion into space, a measurement perpendicular to the object's width, etc.

The holographic imaging device (e.g., the processing unit or the algorithm provided in the processing unit) may combine the processed slices for obtaining a three-dimensional representation of the sample.

In an implementation of the holographic imaging device, the first wave-vector and/or the second wave-vector are predetermined based on relative positions of the at least two light sources.

In particular, the holographic imaging device may also work with lower incidence angles, resulting in a compact (and practical for implementation in instruments) light source as well as a larger field of view due to lower area of "non-overlap" between illumination cones compared to the conventional topography techniques.

In some embodiments of the disclosed technology, a calibration of the holographic imaging device may be required. For example, the holographic imaging device may be sensitive to errors in the light source positions. The first wave-vector and/or the second wave-vector may be determined and the holographic imaging device may be calibrated.

In a further implementation of the holographic imaging device, the processing unit is further configured to obtain at least two phase-retrieved holograms based on estimating a phase of each of the at least two holograms. This provides the advantage that the out-of-focus ghost image of the object may be removed.

In a further implementation of the holographic imaging device, the phase of a first hologram is estimated based on performing an iterative phase retrieval procedure by using a second hologram obtained with a different wavelength of illumination.

In a further implementation of the holographic imaging device, the processing unit is further configured to determine a signature for an out-of-focus plane signal originating from a ghost image of the object, based on a comparison of the at least two phase-retrieved holograms, and remove, from the at least two phase-retrieved holograms, at least one out-of-focus plane signal originating from the ghost image of the object.

In particular, since the optical path between the object and, for example, an imager of the holographic imaging device changes for different illumination beams, this may result in a difference between the obtained holograms. Moreover, the changes in the optical paths may be used for determining (e.g., removing) different ghost images of the same object in the reconstructed hologram.

In a further implementation of the holographic imaging device, constructing the at least two 2D image slices comprises obtaining, based on the at least two phase-retrieved holograms, at least two 2D image slices each for a respective depth within the object volume.

In a further implementation of the holographic imaging device, the processing unit is further configured to compare the at least two 2D image slices, identify spatially overlapped signals in the at least two 2D image slices indicating in-focus signals of the object, and identify substantially shifted signals in the at least two 2D image slices indicating out-of-focus signals originating from other real objects located in out-of-focus-planes.

In a further implementation of the holographic imaging device, the processing unit is further configured to remove, from the at least two 2D image slices, at least one identified out-of-focus plane signal originating from another real object, and perform a noise removal procedure for minimizing a difference between the at least two 2D image slices. This provides the advantage that the out-of-focus real object signals (for example, of another real object, which may be located at a different depth) may be determined and may further be removed.

In a further implementation of the holographic imaging device, performing the noise removal procedure comprises removing out-of-focus plane signals that are spatially dislocated among the at least two 2D image slices, and/or determining and maintaining in-focus signals that are overlapped in the at least two 2D image slices.

In a further implementation of the holographic imaging device, the processing unit is further configured to stack the constructed at least two 2D image slices, for generating the 3D image of the object, wherein each 2D image slice is used at its determined depth within the object volume. This provides the advantage that the generated 3D image of the object may be provided. Moreover, for example, the exact volumes of the objects in the sample may be determined, which may enable quantitative image analysis. Such quantitative image analysis may have application in volumetric imaging of biological samples, for example, bacteria, cells or other samples in suspension, colony, reactor etc. This is important, for example, to determine the growth rate, motility or division behavior of the cells, bacteria, etc., under different environmental conditions.

Another application of the holographic imaging device may be in air quality monitoring, water quality monitoring, pollen monitoring, industrial monitoring of fluids or gases, and in principle any imaging application requiring volumetric imaging capability at high lateral and axial resolution implemented as a simple, miniature and cost-effective imaging setup.

In a further implementation of the holographic imaging device, the imaging unit is further comprising at least one imager, and wherein each light source is arranged at a predefined position from the at least one imager.

In a further implementation of the holographic imaging device, the at least one imager is based on a Complementary Metal Oxide Semiconductor (CMOS) image sensor.

In a further implementation of the holographic imaging device, the first wavelength and/or the second wavelength are within a range of 300 nm to 900 nm.

In particular, the first wavelength and/or the second wavelength may be within visible spectrum.

A second aspect of the invention provides a method for a holographic imaging device, the method comprises illuminating, by an imaging unit comprising at least two light sources, an object by emitting at least two light beams with the at least two light sources, wherein a first light beam has a first wave-vector and a first wavelength and a second light beam has a second wave-vector that is different from the first wave-vector and a second wavelength that is different from the first wavelength, obtaining, by a processing unit, at least two holograms of the object by controlling the imaging unit to sequentially illuminate the object with respectively the first light beam and the second light beam, constructing, by the processing unit, at least two two-dimensional (2D) image slices based on the at least two holograms, wherein each 2D image slice is constructed at a determined depth within the object volume, and generating, by the processing unit, a three-dimensional (3D) image of the object based on a combination of the 2D image slices.

The method of the second aspect can be further developed according to the foregoing implementations of the holographic imaging device of the first aspect. The method of the second aspect thus achieves the same advantages as the holographic imaging device of the first aspect and its implementations.

A third aspect of the disclosed technology provides a computer program which, when executed by a computer, causes the method of the second aspect to be performed.

In some embodiments, the computer program may be provided on a non-transitory computer-readable recording medium.

BRIEF DESCRIPTION OF THE DRAWINGS

The above described aspects and implementations are explained in the following description of embodiments with respect to the enclosed drawings:

FIGS. 7A-B shows an image of planar samples obtained by, a conventional device (FIG. 7A) and the holographic imaging device of the invention (FIG. 7B);

DETAILED DESCRIPTION OF CERTAIN ILLUSTRATIVE EMBODIMENTS

Figure 1:
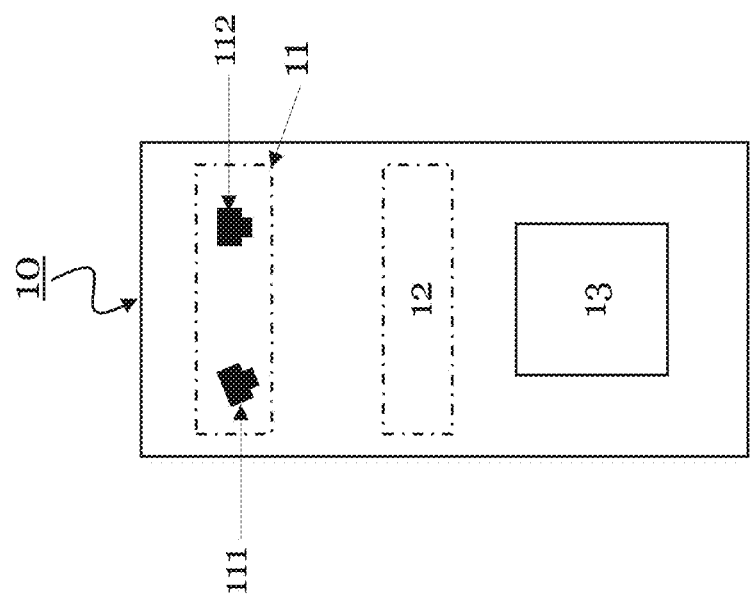
FIG. 1 shows a schematic view of a holographic imaging device for generating a 3D image of an object, according to an embodiment of the disclosed technology.

FIG. 1 shows a schematic view of a holographic imaging device 10 for generating a 3D image of an object, according to an embodiment of the disclosed technology.

The holographic imaging device 10 comprises an imaging unit 11 having at least two light sources 111, 112. The imaging unit 11 is configured to illuminate an object 12 by emitting at least two light beams with the at least two light sources 111, 112, wherein a first light beam has a first wave-vector and a first wavelength and a second light beam has a second wave-vector that is different from the first wave-vector and a second wavelength that is different from the first wavelength.

The holographic imaging device 10 may thus use an illumination method entailing multiple light beams with both angular and spectral pluralities.

The holographic imaging device 10 further comprises a processing unit 13 configured to obtain at least two holograms of the object 12 by controlling the imaging unit 11 to sequentially illuminate the object 12 with respectively the first light beam and the second light beam, construct at least two 2D image slices based on the at least two holograms, wherein each 2D image slice is constructed at a determined depth within the object volume, and generate a 3D image of the object 12 based on a combination of the 2D image slices.

The processing unit 13 may comprise a circuitry. The circuitry may comprise hardware (e.g., the imaging unit, a display, the processing unit (e.g., a Central Processing Unit (CPU)), a memory, etc.) and software (e.g., a program for constructing 2D image slices, a program/algorithm for generating 3D image, etc.).

For example, the processing unit 13 may obtain the holograms. Moreover, the holograms recorded with such pluralities may be reconstructed digitally based on the 2D diffraction theory and image processing algorithms.

The holographic imaging device 10 (e.g., its processing unit 13, or a program such as an algorithm running on the processing unit 13) may use the differences in recorded holograms generated by the angular and spectral pluralities in an iterative procedure in which at each step the in-focus signal is identified and cleaned from the out-of-focus signal. The holographic imaging device 10 (e.g., its processing unit 13) may repeat this procedure several times at different depths.

Moreover, the holographic imaging device 10 (e.g., its processing unit 13) may combine the 2D image slices to obtain a 3D image (i.e., a 3D representation of the sample).

Figure 2:
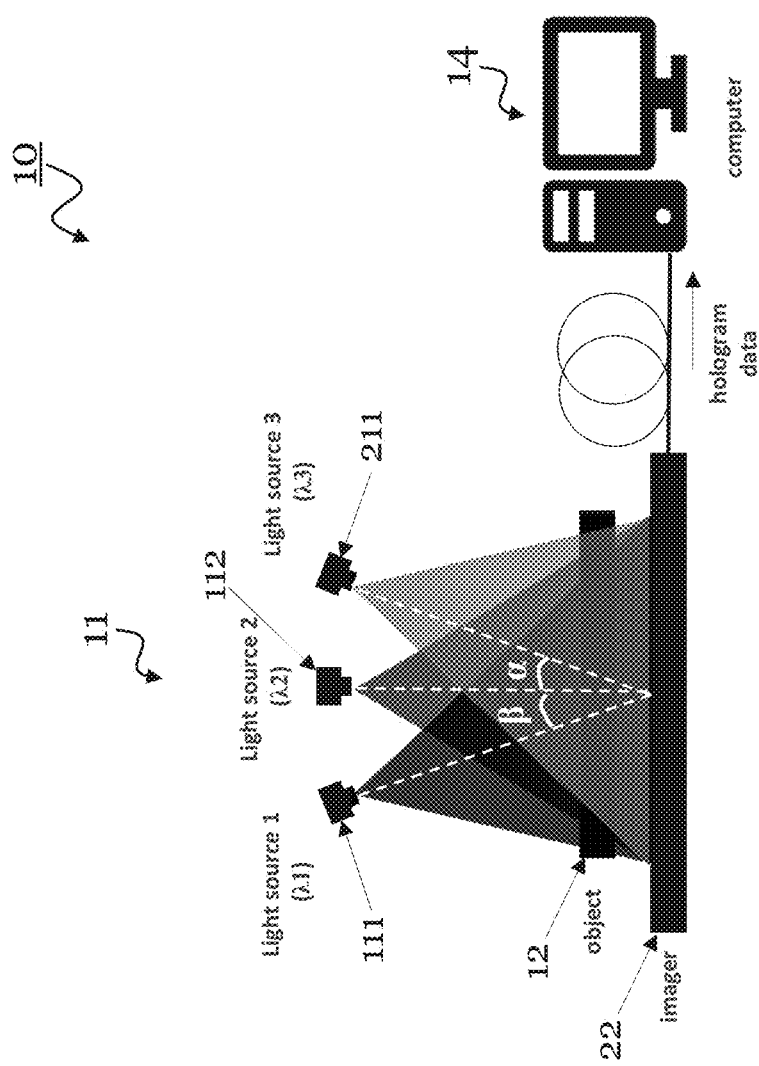
FIG. 2 shows another schematic view of the holographic imaging device, according to an embodiment of the disclosed technology.

Reference is made to FIG. 2, which is another schematic view of the holographic imaging device 10, according to an embodiment of the invention.

The imaging unit 11 of the holographic imaging device 10 comprises three light sources including the "light source 1" 111 illuminating with the first wavelength λ1, the "light source 2" 112 illuminating with the second wavelength λ2, the "light source 3" 211 illuminating with the third wavelength λ3.

The holographic imaging device 10 further comprises an imager 22 and the processing unit 14 (e.g., a computer).

The holographic imaging device 10 of FIG. 2 configured to illuminate multiple light beams with the wave-vector (angular) and wavelength (spectral) pluralities. For example, three light beams are generated from three light sources 111, 112, 211 which are in or at different locations with respect to the origin of the imaging system. Furthermore, each of the light sources 111, 112, 211 emits a corresponding light beam with a different wavelength. The pluralities of wave-vectors and wavelengths may lead (e.g., may be used) to suppressing two distinct sources of out-of-focus plane signals.

Figure 3:
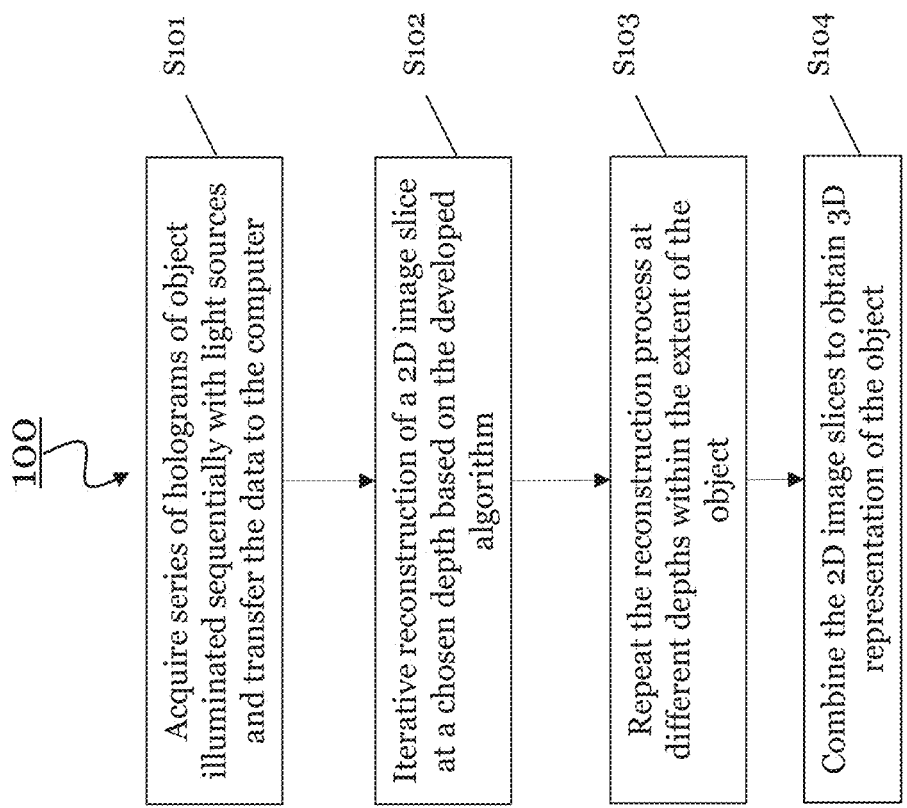
FIG. 3 shows a flow chart of a method of generating a 3D image of an object.

Reference is made to FIG. 3, which is a flow chart of a method 100 for generating a 3D image of an object. The method 100 may be performed by the holographic imaging device 10 (of FIG. 1 and/or FIG. 2).

Without limiting the present disclosure, in the following, the method 100 is discussed exemplarily being performed by the holographic imaging device 10.

At step S101, the holographic imaging device 10 acquires series of holograms of object 12 illuminated sequentially with light sources 111, 112, 211 and transfer the data to the computer 14.

At step S102, the holographic imaging device 10 performs iterative reconstruction of a 2D image slice at a chosen depth based on the developed algorithm.

At step S103, the holographic imaging device 10 repeats the reconstruction process at different depths within the extent of the object 12.

At step S104, the holographic imaging device 10 combines the 2D image slices to obtain a 3D representation of the object 12.

Figure 4B:
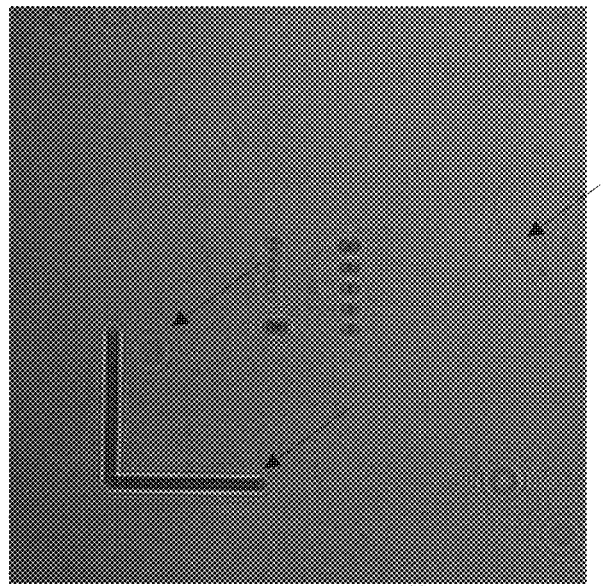
FIGS. 4A-B shows different obtained holograms.
Figure 4A:
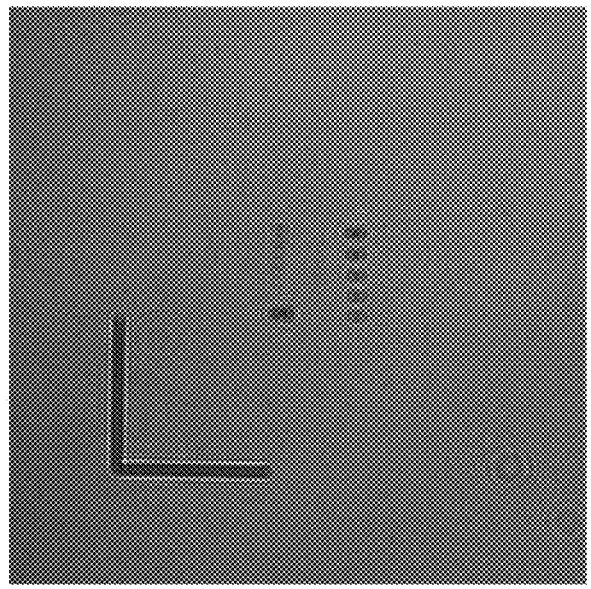

Reference is made to FIG. 4A and FIG. 4B, in which FIG. 4A shows an example of recorded holograms (three holograms in sequence provided as a video) of a sample obtained by the holographic imaging device 10 with three light sources 111, 112, 211 with different wavelengths but the same wave-vector directions. The main image features on the hologram (the interference patterns) look very similar to each other except that the fine fringes on the interference pattern are observed to shift with different wavelength of illumination.

The differences between the holograms are observed, since the optical path between the objects 12 in the sample and the imager 22 changes with different illumination beams despite the fixed physical distance. The difference in the optical paths can result in different ghost images of the same object 12 in the reconstructed hologram. Thus, the plurality of illumination wavelengths (illuminated by the holographic imaging device 10) results in a distinguishable signature for the out-of-focus plane signal originating from the ghost image of the object 12.

The plurality of wavelengths in practice may be within a range of 300 nm to 900 nm (for example, it may be limited within visible spectrum $\lambda$=400 nm-700 nm, in which CMOS image sensors are typically sensitive and optical properties of objects do not vary widely). While such range is sufficient to create distinguishable signatures between the object 12 and its ghost in practice (typically located hundreds of microns away from the object in depth), this approach may not be useful for signals originating from other real objects located in out-of-focus planes that are relatively close to the in-focus plane slice.

The holographic imaging device 10 is further configured to provide the plurality of wave-vectors of light beams to overcome the out-of-focus plane signals. FIG. 4B shows an example of recorded holograms of the sample with three light sources 111, 112, 211 with different wave-vectors (three holograms in sequence provided as a video in FIG.4B). Differently from FIG. 4A, the features in the holograms shift laterally according to the wave-vector of the illumination beam. The strength of the relative shift between the holograms depends on the distance of the objects 12 from the image sensor 22. The closer the object 12 is to the imager 22, the smaller the shift with varying wave-vector will be. The arrows in FIG. 4B indicate to three distinct features in the hologram sequence. These three features originate from objects located three different depths. The feature in the bottom side of the hologram hardly shifts while the other two features shift visibly in the hologram sequence. A careful inspection suggests that the L-shaped feature shifts less than the circular one indicating that the L-shaped object is closer to the imager in distance. Thus, the plurality of illumination wave-vectors (provided by the holographic imaging device 10) results in a distinguishable signature for the signals originating from objects located at different depths. The strength of the distinguishable signature is a function of illumination beam angle and the pixel size of the imager 22. The larger the angle of the illumination is and the smaller the imager pixel size is, the larger the signature distinguishing two objects closely spaced slices will be.

It is important to note that the plurality of illumination wave-vectors alone may not be useful in creating a distinguishable signature of the out-of-focus plane originating from the ghost object image, since the ghost image shifts together with the object image and both always overlap with each other regardless of the wave-vector direction. Therefore, the holographic imaging device 10 provides both types of illumination pluralities (wave-vector and wavelength) in creating distinguishable signatures to effectively suppress different types of out-of-focus plane signals in the reconstructed images. A discussion of processing the multiple holograms to achieve the out-of-focus signal suppression is provided below.

In the following, description of the 2D image construction and generating the 3D image is provided.

Once the holographic imaging device 10 obtains the multiple holograms (e.g., acquired with the mentioned illumination method), the next step is digitally processing them to obtain 2D image slices of the object at different depths with suppressed out-of-focus signals. The steps of image reconstruction and processing may be split into three steps as follows.

The goal of the first step is to identify the wave-vectors of the light sources using a sample suitable for the purpose. This may be a practical calibration procedure before taking a measurement of sample. For example, in some embodiments, accurate knowledge of the wave-vectors assists in the subsequent image reconstruction steps.

Figure 5:
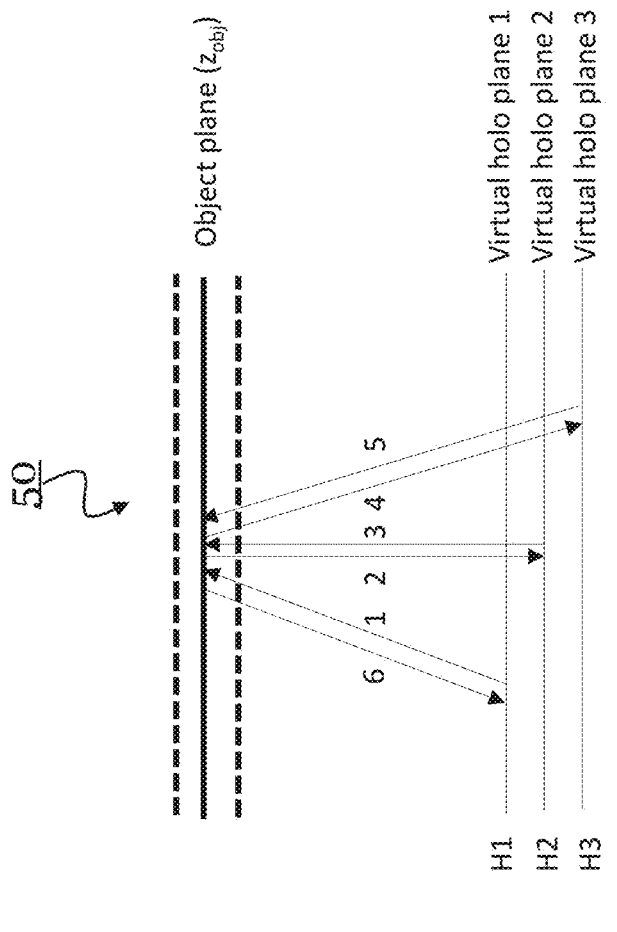
FIG. 5 shows a schematic view of a diagram illustrating obtaining a phase-retrieved hologram.

Reference is made to FIG. 5, which shows a schematic view of a diagram 50 for determining the first wave-vector and the second wave-vector and obtaining a phase-retrieved hologram.

Initially, the holographic imaging device 10 may determine the first wave-vector and the second wave-vector and may calibrate the position of the light sources 111, 112, 113 based thereon.

The goals of the first step may be:
  Determining the relative source positions (x, y).
  Converting the source positions into wave-vectors with a known source displacement of z.

The performed operations of the first step may be summarized as follows:
  Estimating the relative shift of the holograms with sub-pixel accuracy, for example, using an algorithm based on a fast implementation of cross correlation between the images.
  Reconstructing firstly the holograms in focus with an "initial guess of the positions".
  Using the reconstructed object images for determining the sharp features and obtaining a better accuracy for registration.
  Applying an image registration procedure for the reconstructed images and determining the error in the initial guess.
  Identifying accurate x, y positions per source.
  Determining the wave-vectors.

In the second step, the holographic imaging device 10 may further obtain the phase-retrieved holograms.

For instance, the holograms acquired with the imager 22 may contain only the intensity of the hologram and the phase component may be lost. The holographic imaging device 10 may apply a phase retrieval procedure to estimate the phase of holograms using the plurality of the wavelengths of illumination. It is important to note that the second phase is repeated for all the holograms acquired from the imager. Therefore, a phase estimation is done on all the holograms.

The output of the second step is the three phase-retrieved holograms, which will be passed to step three.

The goals of the second step may be:
Phase retrieval for the holograms using the wavelength plurality.
Removal of an out of focus plane ghost image signal.

The performed operations may be summarized as follow:
Phase retrieval may be based on propagating complex valued holograms and replacing the phases at even steps (steps of a single iteration drawn for H1 on the left).
Choosing a slice ($z_{obj}$) in the object volume for reconstruction.
After N iterations, repeating step one for obtaining ghost-free image of the object with wavevector-1.
Repeating the process for all the holograms (e.g., H2 and H3).
Obtaining as final output, three holograms with retrieved phases.

The reconstruction of these holograms in the next step may result in a cleaned ghost image signal.

Figures 6A, 6B:
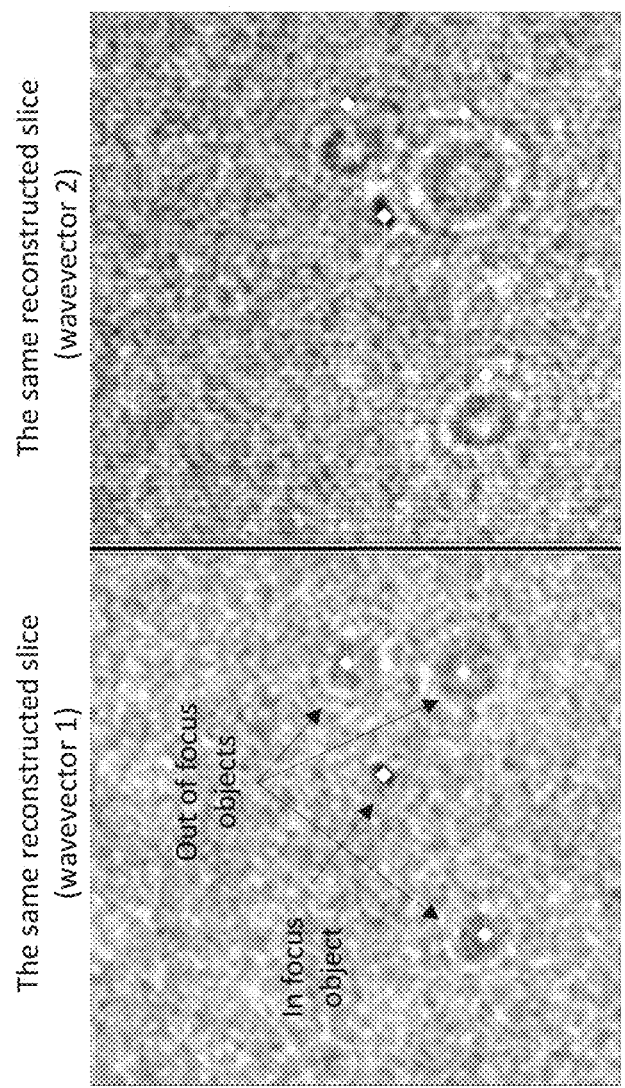
FIGS. 6A-B shows exemplarily obtained holograms with the first wave-vector (FIG. 6A) and the second wave-vector (FIG. 6B)

At the third step, the object image reconstruction may be performed by using the phase retrieved holograms corresponding to three different wave-vector illumination beams. The first process is to reconstruct three 2D image slices within the object volume from the phase retrieved holograms. For example, the holographic imaging device 10 may use a 2D diffraction theory based on field propagation such as angular spectrum, etc. Note that the reconstructed slices are free-from out-of-focus signals originating from the ghost image but not the signals generated from the objects (for example, another object than the desired object) located near the slice depth. An example of such slices is shown in FIG. 6A and FIG. 6B. These two images reveal that in-focus signals overlap spatially in two images while the out-of-focus signals are shifted relatively.

Once the reconstructed slices are obtained, the holographic imaging device 10 may suppress the out-of-focus signals using the three reconstructed slices and a noise removal algorithm designed to minimize differences between the reconstructed slices from three different holograms. The noise removal algorithm succeeds to reject out-of-focus plane signal since only the in-focus signal overlaps in all different slices while out-of-focus signal is spatially dislocated among the three slices.

The holographic imaging device 10 may use different noise removal procedures. For example, the simplest approach may be averaging the three reconstructed slices as the overlapping in-focus signal will be enhanced while non-overlapping out-of-focus signal will be averaged out. More advanced approaches may be used to suppress the unwanted signals. One of such approaches is formulating the in-focus signal as an inverse problem and minimizing the error using regularization in an iterative optimization algorithm. L1, L2 and total variation (TV) normalization may be used in image processing to solve inverse problems depending on the nature of the problem. Such an approach can be used to minimize the error occurring in three distinct reconstructed slices enabled by the different wave-vectors.

The holographic imaging device 10 may process the slices at other depths in a similar procedure as explained above. Once all the slices in the sample volume are processed, the slices can be stacked into a 3D data representation. The holographic imaging device 10 may enable enhanced depth resolution to create true 3D imaging of complex samples.

Experimental validation of the proposed invention is done, and some initial results (obtained by the holographic imaging device 10) are presented in the following, without limiting the present disclosure.

FIGS. 7A-B shows an image of planar samples of metal lines on a substrate obtained by, a conventional device (FIG. 7A) and the holographic imaging device 10 of the invention (FIG. 7B).

As it can be derived from FIG. 7B, the holographic imaging device 10 removes the ghost image related out-of-focus signal.

Figures 8A, 8B:
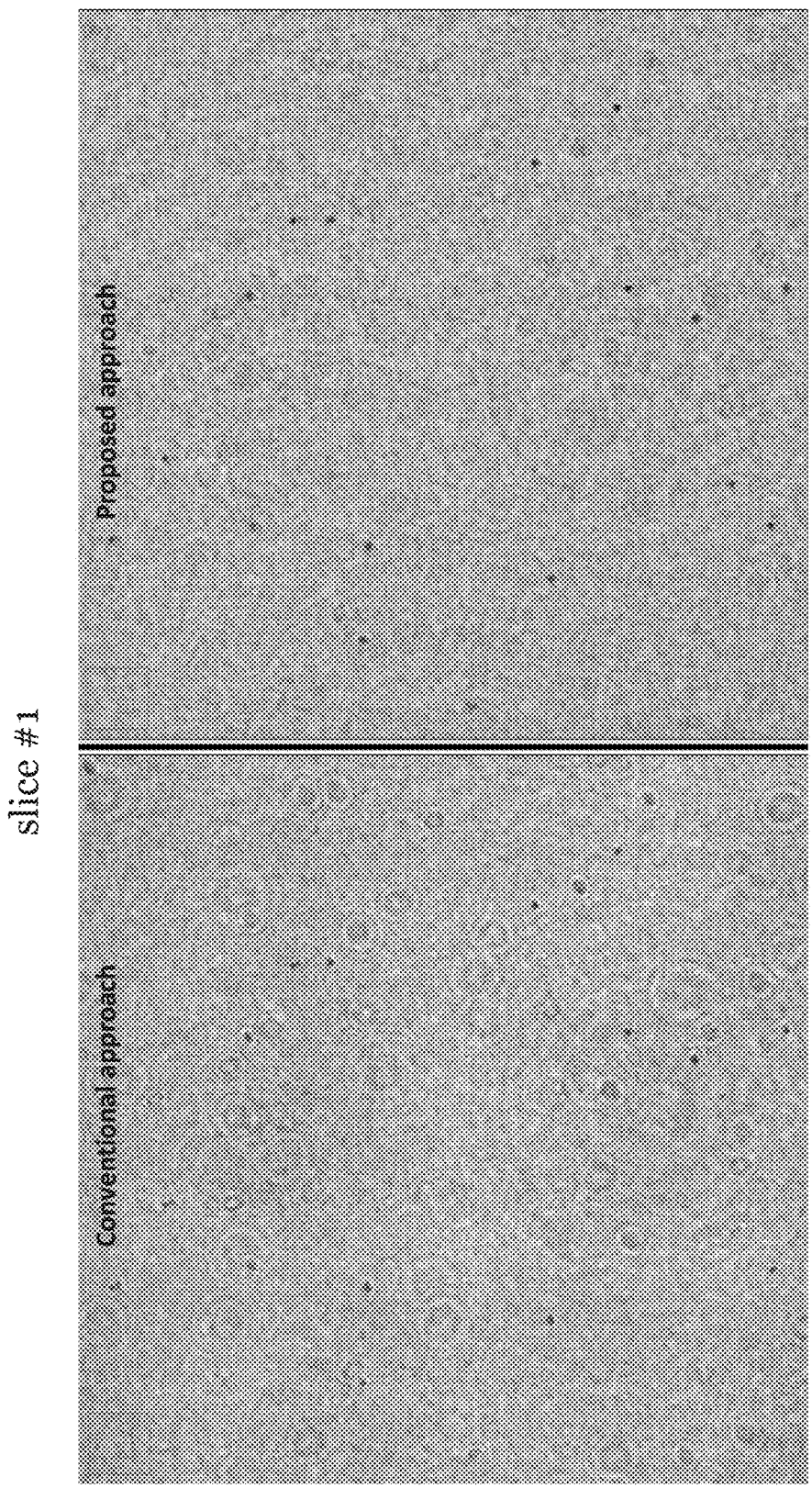
FIGS. 8A-B shows an image slice from a sample including micron beads dispersed in a 500-micron thick gel obtained by a conventional device (FIG. 8A) and the holographic imaging device of the disclosed technology (FIG. 8B)

FIGS. 8A-B shows an image slice (slice #1) from a sample including micron beads dispersed in 500-micron thick gel obtained by, a conventional device (FIG. 8A) and the holographic imaging device of the invention (FIG. 8B).

As it can be derived from FIG. 8B, the holographic imaging device 10 removes (from slice #1) the out-of-focus plane signals.

Figures 9A, 9B:
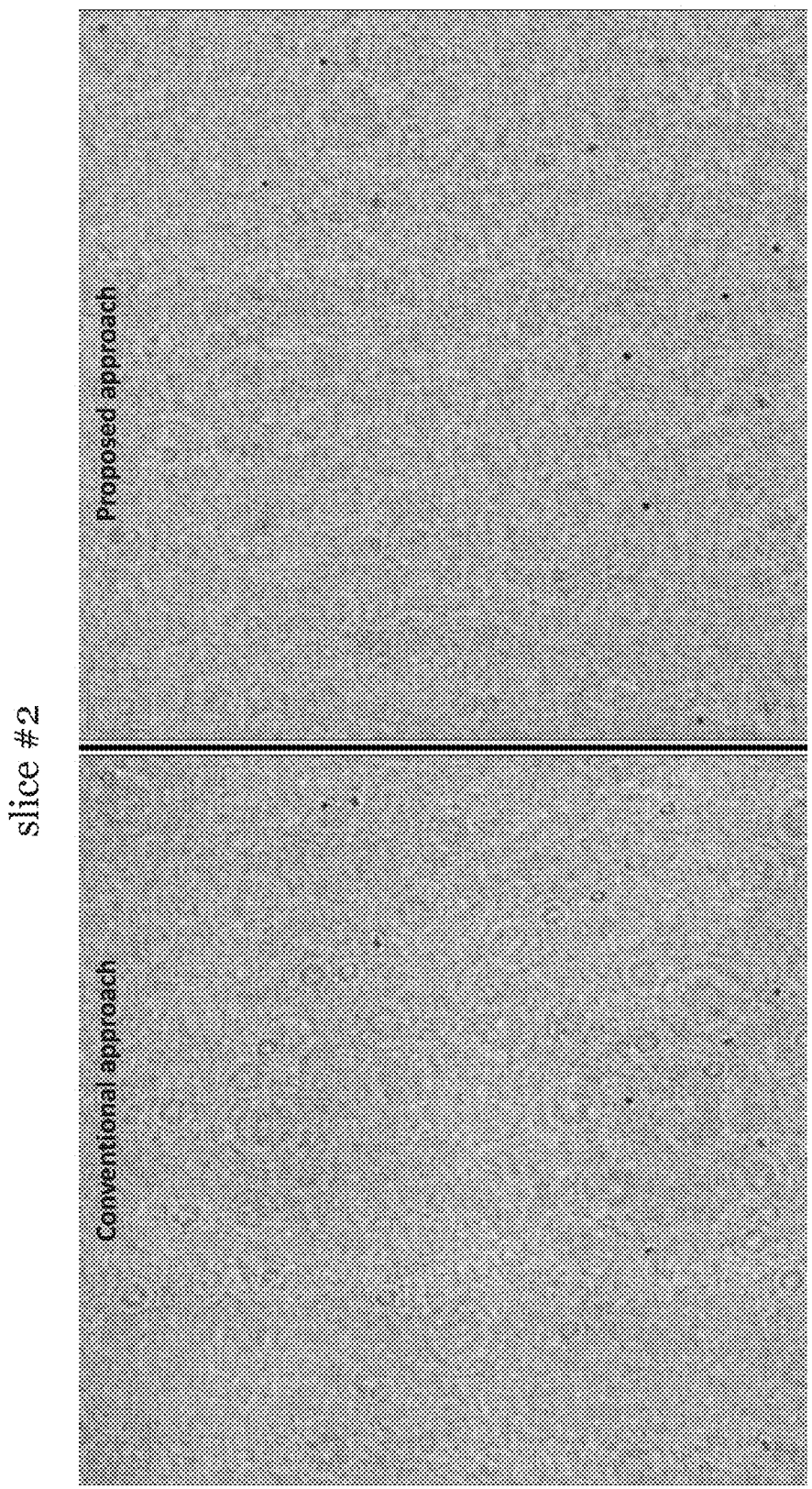
FIGS. 9A-B shows another image slice from the sample of FIGS. 8A-B obtained by, a conventional device (FIG. 9A) and the holographic imaging device of the disclosed technology (FIG. 9B)

FIGS. 9A-B shows another image slice (slice #2) from the sample of FIGS. 8A-B obtained by, a conventional device (FIG. 9A) and the holographic imaging device of the invention (FIG. 9B).

As it can be derived from FIG. 9B, the holographic imaging device 10 removes (from slice #2) the out-of-focus plane signals.

As it can be derived from the two image slices (e.g., FIG. 8B and FIG. 9B) that are obtained from the sample containing 1-micron sized beads distributed in a 3D volume, the holographic imaging device 10 effectively suppresses the out-of-focus signal originating from beads in other depths.

Figure 10:
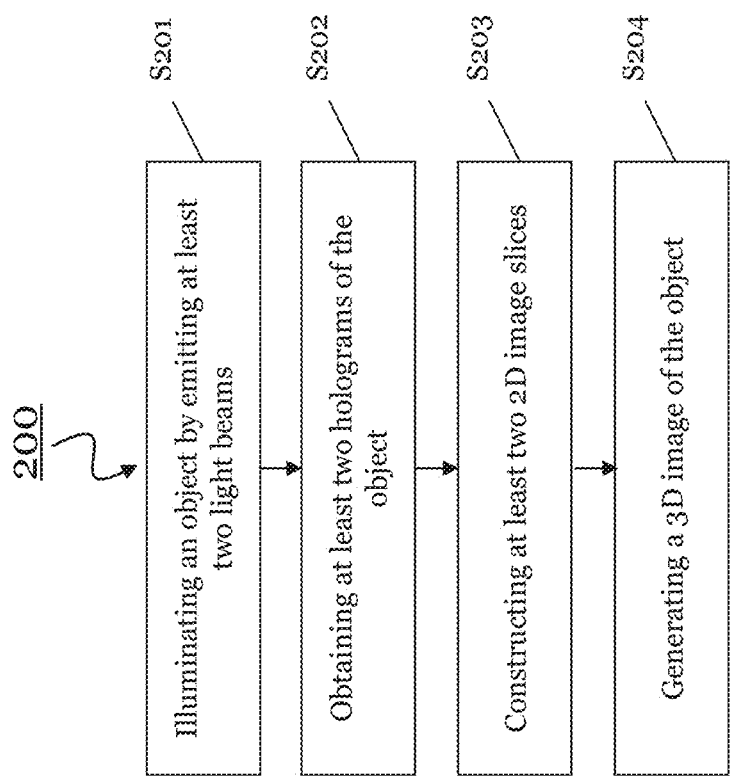
FIG. 10 shows a method for the holographic imaging device, according to an embodiment of the disclosed technology.
Figure 11:
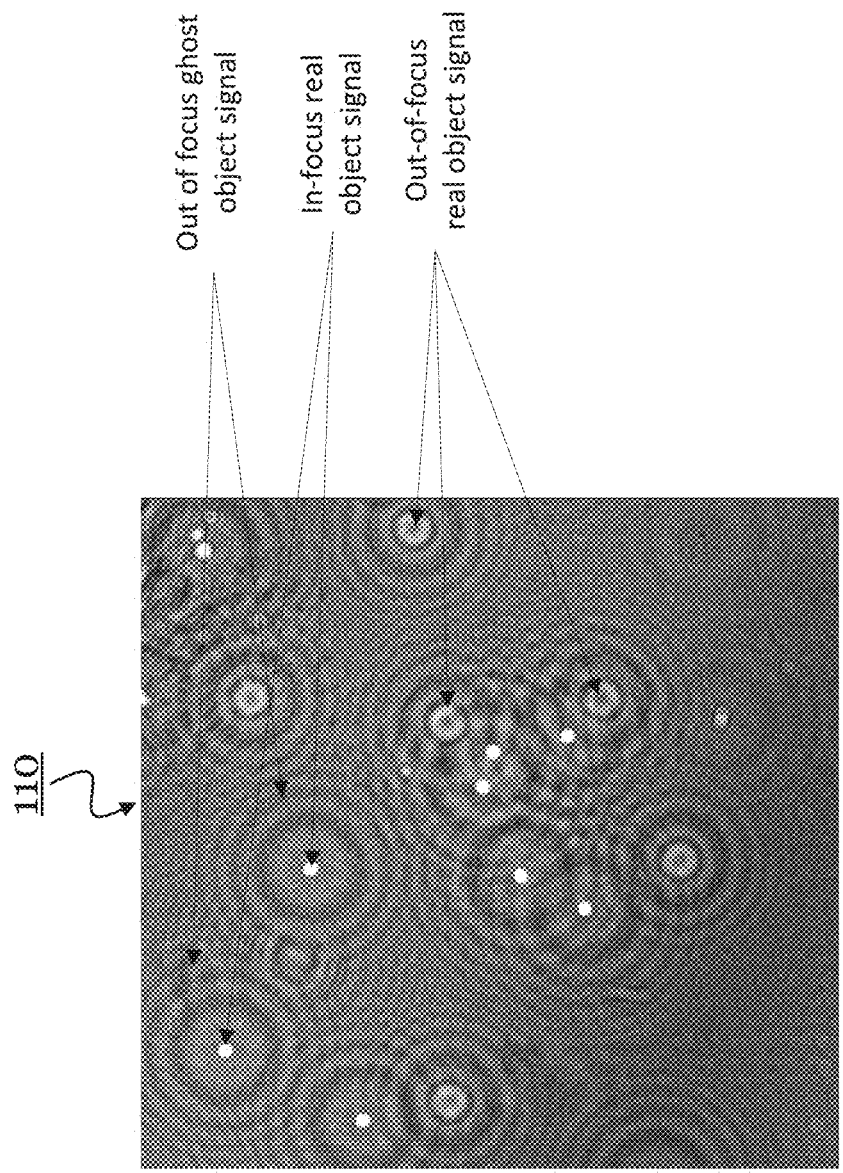
FIG. 11 shows problems of out-of-focus signals in 2D image slices obtained by a conventional holographic imaging device.

FIG. 10 shows a method 200 according to an embodiment of the invention for a holographic imaging device 10. The method 200 may be carried out by the holographic imaging device 10, as it is described above.

The method 200 comprises a step S201 of illuminating, by an imaging unit 11 comprising at least two light sources 111, 112, an object 12 by emitting at least two light beams with the at least two light sources, wherein a first light beam has a first wave-vector and a first wavelength and a second light beam has a second wave-vector that is different from the first wave-vector and a second wavelength that is different from the first wavelength.

The method 200 further comprises a step S202 of obtaining, by a processing unit 13, at least two holograms of the object 12 by controlling the imaging unit 11 to sequentially illuminate the object 12 with respectively the first light beam and the second light beam.

The method 200 further comprises a step S203 of constructing, by the processing unit 13, at least two 2D image slices based on the at least two holograms, wherein each 2D image slice is constructed at a determined depth within the object volume.

The method 200 further comprises a step S204 of generating, by the processing unit 13, a 3D image of the object 12 based on a combination of the 2D image slices.

What is claimed is:

1. A holographic imaging device comprising:
an imaging unit comprising at least two light sources and configured to:
illuminate an object by emitting a first light beam with a first one of the at least two light sources and a second light beam with a second one of the at least two light sources, wherein the first light beam has a first wave-vector and a first wavelength and the second light beam has a second wave-vector that is different from the first wave-vector and a second wavelength that is different from the first wavelength; and
a processing unit configured to:

obtain at least two holograms of the object by controlling the imaging unit to sequentially illuminate the object with respectively the first light beam and the second light beam, obtain at least two phase-retrieved holograms based on estimating a phase of each of the at least two holograms, processing the at least two phase-retrieved holograms by: determining a signature for an out-of-focus plane signal originating from a ghost image of the object, based on a comparison of the at least two phase-retrieved holograms, and removing, from the at least two phase-retrieved holograms, at least one out-of-focus plane signal originating from the ghost image of the object, construct at least two two-dimensional (2D) image slices based on the at least two processed phase-retrieved holograms, wherein each 2D image slice is constructed at a determined depth within an object volume of the object, and generate a three-dimensional (3D) image of the object based on a combination of the 2D image slices.

2. The holographic imaging device according to claim 1, wherein:

at least one of the first wave-vector or the second wave-vector are predetermined based on relative positions of the at least two light sources.

3. The holographic imaging device according to claim 1, wherein:

the phase of a first hologram is estimated based on performing an iterative phase retrieval procedure by using a second hologram obtained with a different wavelength of illumination.

4. The holographic imaging device according claim 1, wherein:

constructing the at least two 2D image slices comprises obtaining, based on the at least two processed phase-retrieved holograms, at least two 2D image slices each for a respective depth within the object volume.

5. The holographic imaging device according to claim 4, wherein the processing unit is further configured to:

compare the at least two 2D image slices, identify spatially overlapped signals in the at least two 2D image slices indicating in-focus signals of the object, and identify substantially shifted signals in the at least two 2D image slices indicating out-of-focus signals originating from other real objects located in out-of-focus-planes.

6. The holographic imaging device according to claim 5, wherein the processing unit is further configured to:

remove, from the at least two 2D image slices, at least one identified out-of-focus plane signal originating from another real object, and perform a noise removal procedure for minimizing a difference between the at least two 2D image slices.

7. The holographic imaging device according to claim 6, wherein performing the noise removal procedure comprises at least one of:

removing out-of-focus plane signals that are spatially dislocated among the at least two 2D image slices, or determining and maintaining in-focus signals that are overlapped in the at least two 2D image slices.

8. The holographic imaging device according to claim 6, wherein the processing unit is further configured to:

stack the constructed at least two 2D image slices, for generating the 3D image of the object, wherein each 2D image slice is used at its determined depth within the object volume.

9. The holographic imaging device according to claim 1, wherein the imaging unit is further comprising at least one imager and wherein each light source is arranged at a predefined position from the at least one imager.

10. The holographic imaging device according to claim 9, wherein the at least one imager is based on a complementary metal oxide semiconductor (CMOS) image sensor.

11. The holographic imaging device according to claim 1, wherein:

at least one of the first wavelength or the second wavelength are within a range of 300 nm to 900 nm.

12. A method of using a holographic imaging device, the method comprises:

illuminating, by an imaging unit comprising at least two light sources, an object by emitting a first light beam with a first of the at least two light sources and a second light beam with a second of the at least two light sources, wherein a first light beam has a first wave-vector and a first wavelength and a second light beam has a second wave-vector that is different from the first wave-vector and a second wavelength that is different from the first wavelength, obtaining, by a processing unit, at least two holograms of the object by controlling the imaging unit to sequentially illuminate the object with respectively the first light beam and the second light beam, obtaining, by the processing unit, at least two phase-retrieved holograms based on estimating a phase of each of the at least two holograms, processing, by the processing unit, the at least two phase-retrieved holograms by: determining a signature for an out-of-focus plane signal originating from a ghost image of the object, based on a comparison of the at least two phase-retrieved holograms, and removing, from the at least two phase-retrieved holograms, at least one out-of-focus plane signal originating from the ghost image of the object, constructing, by the processing unit, at least two two-dimensional (2D) image slices based on the at least two processed phase-retrieved holograms, wherein each 2D image slice is constructed at a determined depth within an object volume of the object, and generating, by the processing unit, a three-dimensional (3D) image of the object based on a combination of the 2D image slices.

13. A non-transitory computer readable medium storing a computer program which, when executed by a computer, causes the method of claim 12 to be performed.

* * * * *

UNITED STATES PATENT AND TRADEMARK OFFICE
CERTIFICATE OF CORRECTION

PATENT NO. : 11,487,243 B2
APPLICATION NO. : 17/033123
DATED : November 1, 2022
INVENTOR(S) : Stahl et al.

Page 1 of 1

It is certified that error appears in the above-identified patent and that said Letters Patent is hereby corrected as shown below:

On the Title Page

Column 2, Line 3, item (56) under Other Publications, delete "InPhoton" and insert --In Photon--.

In the Claims

In Column 11, Claim 4, Line 35, after "according" insert --to--.

Signed and Sealed this
Twenty-first Day of February, 2023

Katherine Kelly Vidal
*Director of the United States Patent and Trademark Office*